June 14, 1960 R. P. MEIXNER 2,941,115

TUNING APPARATUS FOR KLYSTRON OSCILLATORS

Filed Jan. 6, 1958

INVENTOR
RAYMOND P. MEIXNER
BY R. J. Craddock
ATTORNEY 2,941,115
Patented June 14, 1960

2,941,115

TUNING APPARATUS FOR KLYSTRON OSCILLATORS

Raymond P. Meixner, Brooklyn, N.Y., assignor to Sperry Rand Corporation, Great Neck, N.Y., a corporation of Delaware Filed Jan. 6, 1958, Ser. No. 707,377
3 Claims. (Cl. 315—5.21)

Figures 1, 2:
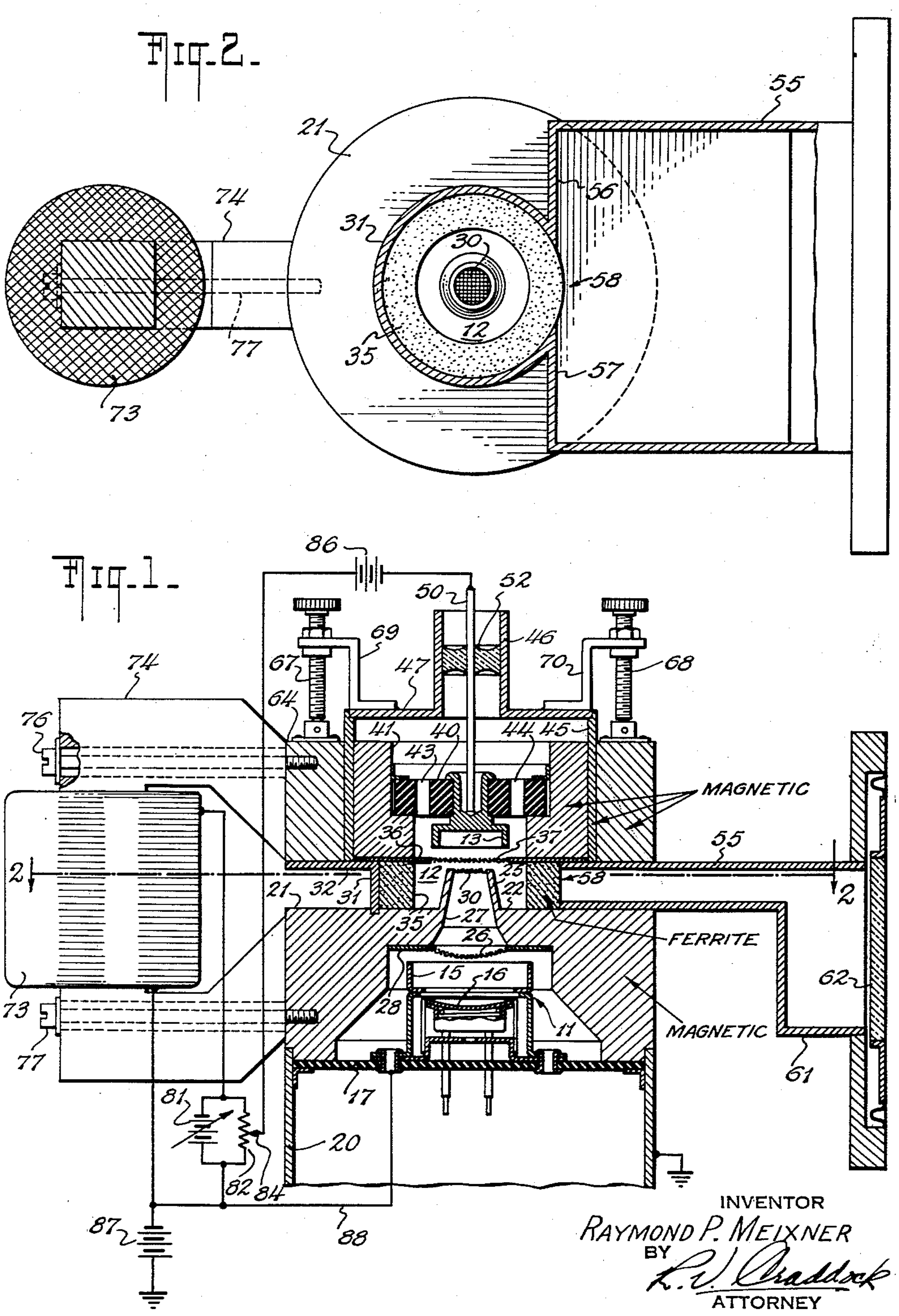

The present invention relates to tuning apparatus for klystron oscillators.

A klystron oscillator for providing high frequency oscillations at a predetermined frequency must be operated in a predetermined klystron voltage mode for providing good power output and stability. Small changes in the frequency of oscillations can be made by making slight changes in the relationship between certain operating voltages of the tube. Large changes in frequency can be made by varying the electrical dimensions of a cavity resonator or resonators in the tube. When large changes in frequency are made, it is necessary to readjust the relationship between the tube operating voltages for sustaining oscillations.

There are many different types of apparatus for tuning a klystron oscillator over a wide frequency band. Most of these require separate adjustments for altering resonator dimensions and tube operating voltages. In some, however, mechanical drive means for changing the physical dimensions of a resonator are ganged with a voltage control means for changing the relationship between tube operating voltages for sustaining oscillations. Generally, tuning apparatus as aforedescribed is not as precise nor as compact and rugged as is desired for some applications.

Therefore, it is an object of this invention to provide improved apparatus for tuning a klystron oscillator over a wide frequency band.

It is another object to provide a klystron oscillator having no mechanical moving parts, and provisions for changing the electrical dimensions of the klystron resonator simultaneously with changes in the relationship between certain operating voltages for sustaining oscillations in a particular klystron voltage mode.

It is a further object to provide an internal cavity klystron oscillator including novel means for electrically tuning the oscillator.

It is still another object to provide a reflex klystron having a rugged tuning assembly.

All of the foregoing and other objects and advantages of the present invention are attained by providing a klystron oscillator having a cavity resonator which includes a low loss microwave ferrite element therein. An adjustable voltage source is provided for energizing an electromagnet for applying a magnetic field to the ferrite to change its microwave tensor permeability, thereby changing the electrical dimensions and frequency of the resonator. The adjustable voltage source is also arranged to supply one of the operating voltages to the klystron. As the foregoing voltages are adjusted, both the klystron operating voltage and the frequency of the resonator are simultaneously changed for sustaining oscillations at different frequencies substantially at the center of a predetermined klystron voltage mode.

In the drawings,

Fig. 1 is a sectional view of a reflex klystron employing the novel tuning apparatus in accordance with the present invention; and Fig. 2 is a cross sectional view of the klystron tube taken along the lines 2—2 of Fig. 1.

Referring now to the drawings, a reflex klystron tube of the internal cavity type is shown as comprising an electron gun subassembly 11, a reentrant cavity resonator 12 and a reflector electrode 13. These parts are coaxially supported and arranged for providing a reflex klystron oscillator.

The electron gun subassembly 11 is composed of a focussing electrode 15 and a spherically concave cathode button 16. These elements are coaxially supported by suitable conductive means upon a circular disc 17 of insulating material, elements 15 and 16 being connected together for operation at the same D.-C. potential. The disc 17 is rigidly supported within an end of a cylindrical metallic envelope 20. Envelope 20 is vacuum sealed at its lower end by suitable means, not shown.

An annular block 21 of magnetic material of high permeability and low retentivity is vacuum sealed to the upper end of envelope 20. The block 21 is suitably apertured for positioning of the electron gun 11 therewithin and for passage of a convergent electron beam through the block. An upper flat end surface 22 of block 21 and a hollow conductive projection 25 therefrom, form an end wall and reentrant conductor portion, respectively, of the resonator 12. The surfaces of 22 and 25 exposed to resonator energy are copper plated, for example, for reducing microwave energy losses in the resonator.

A spherically concave smoother grid 26 is supported across one end of a beam passageway 27 through block 21. The grid 26 is affixed to an annular disc 28 of metallic material such as copper brazed to block 21 as shown in Fig. 1. The grid 26 forms the anode for the electron gun 11, and is held at ground potential by connecting the metallic envelope 20 to ground, for example.

A further grid 30 is provided across the other end of passageway 27 at the top of projection 25, and forms an entrance grid for the klystron modulation gap of resonator 12. The electron gun 11 and smoother grid 26 are designed in accordance with well know principles for providing an electron beam which is convergent from cathode 16 to a minimum diameter region in the vicinity of resonator grid 30.

The side wall of the resonator 12 is formed by a cylindrical conductive member 31 having one end vacuum sealed to a suitable recess in the upper end surface of the block 21. Member 31 is coaxial with the axis of the klystron tube, and has a flat radial extension 32 from its upper end. The member 31 and extension 32 are preferably formed from a material such as copperplated, nonmagnetic stainless steel.

An annular microwave ferrite element 35 of rectangular cross section is disposed within the resonator 12 in coaxial relationship with the axis of the tube. Element 35 is of ferromagnetic material having high resistivity and low losses to microwave energy. A ceramic ferrite having a resistivity of ($10^6$ to $10^9$ ohm cms.) and a dielectric constant of between 10 and 11 for microwave energy has been found suitable. The specific composition of the ferrite is chosen, taking into consideration the magnetic field strengths required to be applied thereto for changing the frequency of the resonator 12 over a desired frequency range, so that ferromagnetic resonance will not occur.

The ferrite element 35 fits snugly within the member 31, and extends along the axis of the tube from the lower surface 22 of resonator 12 to an upper resonator surface formed by a circular conductive plate 36 of copper, for example. Element 35 is thus positioned within a region of high magnetic field intensity within the reentrant klystron resonator 12, the best location for attaining a large tuning range. Also, it is in a region of low electric intensity for minimizing microwave energy losses.

The ferrite element 35 might occupy as much as 50% of the volume of resonator 12, for example. If a smaller volume is occupied, the klystron tuning range is made narrower, while making it possible for attaining a higher power output from the klystron. Since the ferrite element 35 is contained within the vacuum of the klystron tube, it should be air-baked for oxidizing impurities before insertion into the member 31.

The circular plate 36 is attached by resistance brazing, for example, to the upper surface of the flanged extension 32 for holding the ferrite element 35 in place as well as providing the upper wall of resonator 12. Plate 36 is centrally apertured and coaxially supports a further grid 37 in adjacent relationship with the grid 30. Grid 37 is the exit grid for the klystron modulation gap. Grid 37 is of larger diameter than the grid 30 for allowing passage of the reflected portion of the electron beam, which reflected portion diverges from the tube axis as it passes back across the modulation gap into the resonator 12.

The reflector electrode 13 is coaxially supported in spaced relationship from the grid 37 and other parts of the tube by an annular spacer element 40 of insulating material. Spacer element 40 is fixedly supported upon a seat within an annular member 41 of magnetic material of high permeability and low retentivity. The slots 43 and 44 through element 40 are provided so that the portion of the tube therebelow can be readily evacuated.

The annular magnetic member 41 has an inner diameter along the lower portion thereof which is the same or slightly smaller than the inner diameter of the ferrite element 35. The outer diameter of member 41 is somewhat larger than that of element 35. The lower portion of member 41 has a sufficient length along the axis of the tube for ensuring a good path for magnetic flux to be passed through element 35.

Member 41 is affixed to a cylindrical vacuum sealing element 45, also of magnetic material of high permeability and low retentivity. The member 45 is vacuum sealed to flange extension 32 in coaxial relationship with the axis of the tube.

A tubular conductor 46 having a flange extension 47 vacuum sealed to the upper end of the member 45 provides a further portion of the vacuum envelope of the tube. A conductor 50 having one end suitably connected to reflector 13 forms a supply voltage lead for the reflector. The conductor 50 passes through a dielectric supporting element 52 in vacuum sealed relationship therewith for connection to an external reflector voltage source. The element 52 is vacuum sealed to the inner wall of conductor 46.

The end of a section of rectangular wave guide 55 is suitably supported between the upper surface of member 21 and the lower surface of member 36 as illustrated in Fig. 1, and extends in a radial direction from the axis of the tube. The wave guide 55 has a pair of conductive end plates 56 and 57 defining a rectangular aperture 58 for microwave energy coupling with resonator 12 through a rectangular opening in the cylindrical wall 31 of resonator 12. The ferrite element 35 does not undesirably affect the coupling since it is permeable to microwave energy. If desired, the ferrite could be a semicircular member with the space between the ends thereof facing the opening 58 to further minimize any effect on the coupling.

The adjacent edges of the plates 56 and 57 at the end of wave guide 55 are conformal to the outer wall of cylindrical member 31, and are brazed thereto. The upper and lower wide walls of wave guide 55 are brazed to plate 36 and the upper surface of member 21 for vacuum sealing purposes and support of the wave guide 55. The height of wave guide 55 is approximately the same as the extent of resonator 12 along the axis of the tube. The size of the opening 58 for exchanging microwave energy between resonator 12 and wave guide 55 is chosen for providing a desired amount of energy transfer to wave guide 55 with a minimum of reflection.

The wave guide 55 extends radially away from the klystron tube. The length of wave guide 55 is best chosen empirically for providing an optimum impedance match between the resonator 12 and a further section of rectangular wave guide 61.

The wave guide 61 has the same width dimension as wave guide 55, and a larger height dimension. The dimensions of rectangular wave guide 61 are standard for dominant mode propagation, i.e., the width is approximately twice the height. The wide dimensions of wave guide sections 55 and 61 are sufficiently large for the propagation of dominant mode transverse electric microwave energy over the frequency band of the klystron oscillator. A dielectric element 62 is provided across the interior of wave guide 61 for vacuum sealing the tube.

An annular member 64 of magnetic material of high permeability and low retentivity is disposed about the envelope 45 of the tube in close-fitting relationship therewith as is shown in Fig. 1. The outer diameter of member 64 is the same as that of the annular member 21. Member 64 extends along the axis of the tube for approximately the same distance as member 41. Screw elements 67 and 68 supported by brackets 69 and 70, respectively, affixed to plate 47, are provided for axial adjustment of member 64. The screw elements 67 and 68 are displaced apart by 120° from each other and a further screw element, not shown, which is also adjustable.

An electromagnet composed of a winding 73 disposed about the center arm of a U-shaped member 74 of magnetic material having high permeability and low retentivity is provided for the purpose of magnetizing the ferrite element 35. The member 74 is supported upon the tube by means of a pair of screws 76 and 77, which hold the end faces of the arms of member 74 in abutment with the circular members 64 and 21 of the tube, respectively. These end faces conform to the cylindrical walls of members 21 and 64.

A source of voltage composed of an adjustable unidirectional potential source 81 is provided for supplying a magnetizing potential to the coil 73. One end of coil 73 is connected directly to the negative terminal of source 81, while the other end of coil 73 is connected to the positive terminal of source 81.

A positive terminal of a further unidirectional potential source 86 is connected by an adjustable tap 84 along a potentiometer 82 provided across the source 81. The negative terminal of source 86 is connected to rod 50 and, thus to the reflector electrode 13.

Another unidirectional potential source 87 having its negative terminal connected to the positive terminal of source 81, is provided for supplying a negative voltage to cathode 16 by way of lead 88. The conductive envelope of the tube is grounded, for example, as is the positive terminal of source 87. Thus, the anode or smoother grid 26 is at ground potential, the cathode 16 is at a negative potential relative to grid 26, with the reflector electrode 13 potential being negative relative to cathode 16. The magnetizing potential applied to coil 73 and the reflector electrode potential will change with any adjustment of source 81. The potentiometer 82 and adjustable tap 84 are provided for choosing a klystron reflector voltage for operation of the tube in a predetermined reflector voltage mode.

The arms of the U-shaped member 74, magnetic members 21 and 64, magnetic member 41 and the ferrite element 35 provide a low reluctance flux path for the magnetic field of coil 73 when energized. The magnetic flux passes through ferrite element 35 in a direction parallel to the axis of the reentrant resonator 12, the tensor permeability of the ferrite element being a function of the intensity of the D.-C. magnetic field applied to the ferrite element. The electrical dimensions and, consequently, the frequency of the resonator 12 are functions of the tensor permeability of the ferrite. Thus, the frequency of resonator 12 is a function of the strength of the D.-C. magnetizing field applied to the ferrite element 35. The polarity of this field is inconsequential.

The slope of a tuning curve of resonator frequency as an ordinate versus magnetizing current as an abscissa for a klystron tuned by means such as shown in Fig. 1 is determined by the size of coil 73 and the reluctance of the flux path for the magnetic field of the coil. Once a particular coil size is chosen, the slope of the aforementioned tuning curve can be changed by adjusting screws 67, 68 and the further similar screw, not shown, for changing the axial position of the magnetic member 64. The member 64 is illustrated in one extreme position for obtaining a minimum reluctance in the aforedescribed flux path. When screws 67 and 68 are adjusted for moving member 64 upward away from the member 32, a partial air gap is introduced into the flux path, thereby increasing its reluctance. An increase in the reluctance requires an increase in the range of magnetizing current required to tune the resonator over the same frequency range.

In a reflex klystron as aforedescribed, when the resonator thereof is retuned a change in reflector voltage for sustaining operation in a predetermined voltage mode, set by source 86 and adjustment of tap 84, is a linear function of the change in resonator frequency. If the resonator frequency is increased, the reflector electrode voltage should also be increased for tracking the resonator frequency and sustaining oscillations substantially at the center of a predetermined reflector voltage mode. The change in voltage supplied to coil 73 can be made equal the change in voltage supplied to reflector electrode 13 over the desired tuning range of the klystron if the size of the coil 73 and the reluctance of the flux path for the magnetic field thereof are properly regulated as has been described.

The operation of the reflex klystron oscillator tube illustrated in the drawings is conventional in the art, so need not be described. The means for applying magnetic flux to ferrite element 35 are symmetrical with respect to the electron beam so that the magnetic flux does not have any undesirable effect on the trajectory of the beam within the range of magnetic flux densities used to tune the klystron. The oscillator provides an output at the lowest end of a predetermined frequency band when source 81 is adjusted so that no magnetizing voltage is applied to coil 73. At such a time, the voltage applied to reflector 13 is that from source 86 alone. The output from the tube is obtained from wave guides 55, 61.

As the source 81 is adjusted for increasing the magnetizing voltage applied to coil 73 and the magnetic flux applied to ferrite element 35, the frequency of resonator 12 is increased for sustaining operation at the center of a predetermined reflector voltage mode. Thus, only a single adjustment of source 81 is required for changing the operating frequency of the klystron while maintaining substantially maximum power output for any frequency within the design frequency band therefor. For reflex klystron oscillators as has been described, the oscillator can readily be designed for tuning over a frequency band of the order of five percent of the nominal frequency of the klystron at X-band frequencies.

Although the present invention has been described with specific reference to a reflex klystron oscillator, it should be apparent that other types of klystron oscillators can be tuned in a similar manner, for example, the floating drift tube klystron. In oscillators such as klystrons having two resonators with an internal or external feedback loop therebetween, the anode to cathode beam voltage rather than the reflector electrode beam would be made simultaneously adjustable with changes in magnetizing current for applying a magnetic field to a ferrite element provided in each klystron resonator for changing its frequency. Thus, the operating mode of the klystron can be made to simultaneously track the frequency of oscillations for providing good power output over a wide frequency range.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A klystron oscillator comprising a microwave resonator having an electron permeable passageway therethrough, means including a cathode for producing and directing a beam of electrons through said passageway for interaction with microwave resonator energy, an electron beam controlling electrode disposed in the path of said beam, a ferrite element disposed within said resonator in a region of high magnetic field intensity of microwave oscillations sustained within said resonator, magnetic circuit means including an electromagnet disposed adjacent said resonator for applying a magnetic field of adjustable strength to said ferrite element for changing its tensor permeability and the electrical dimensions of said resonator to vary the resonant frequency of said resonator over a predetermined frequency band, a variable voltage source and means for coupling said source to said electromagnet and to said beam controlling electrode for varying the magnetization of said ferrite element and to simultaneously vary the voltage applied to said beam controlling electrode, the variable voltage applied to said beam controlling electrode being so proportioned with respect to the variable voltage applied to said electromagnet that said oscillator provides substantially maximum power output at any frequency of oscillation within said predetermined frequency band.

2. The combination as claimed in claim 1 including means for varying the reluctance of said magnetic circuit.

3. A reflex klystron oscillator comprising a cavity resonator having an electron permeable passageway therethrough, means positioned on one side of said passageway for producing and directing an electron beam through said cavity for interaction with microwave energy in said resonator, a reflector electrode positioned on the opposite side of said passageway and having a negative voltage impressed thereon for redirecting said electron beam back into said resonator for sustaining oscillations therein, a ferrite element disposed within said resonator in a region of high magnetic field intensity of microwave oscillations sustained within said resonator, an electromagnet disposed adjacent said resonator for applying a magnetic field to said ferrite element, an adjustable source of voltage connected to said electromagnet for varying the magnetization of said ferrite element thereby to vary the resonant frequency of said resonator over a predetermined range of frequencies, and means for connecting said adjustable voltage source to said reflector electrode, the voltage applied to said reflector being so proportioned with respect to the voltage applied to said electromagnet that said klystron oscillator produces substantially maximum power output at any frequency of oscillation within said predetermined range of frequencies.

References Cited in the file of this patent

UNITED STATES PATENTS

| | | |
|---|---|---|
| 2,537,112 | Woodyard | Jan. 9, 1951 |
| 2,619,611 | Norton et al. | Nov. 25, 1952 |

| | | |
|---|---|---|
| 2,798,183 | Sensiper | July 2, 1957 |
| 2,851,631 | Birdsall | Sept. 9, 1958 |
| 2,853,646 | Geisler | Sept. 23, 1958 |

FOREIGN PATENTS

| | | |
|---|---|---|
| 673,761 | Great Britain | June 11, 1952 |
| 1,108,985 | France | Sept. 14, 1955 |